United States Patent
Eryazici et al.

(10) Patent No.: US 12,030,972 B2
(45) Date of Patent: Jul. 9, 2024

(54) AQUEOUS DISPERSION OF POLYMERIC COMPOSITE MICROSPHERES

(71) Applicants: Rohm and Haas Company, Collegeville, PA (US); Dow Silicones Corporation, Midland, MI (US)

(72) Inventors: Ibrahim Eryazici, Phoenixville, PA (US); Joseph Grant, Philadelphia, PA (US); Joshua M. Katzenstein, Midland, MI (US); Yihan Liu, Midland, MI (US); Edwin A. Nungesser, Horsham, PA (US); Brett L. Zimmerman, Frankenmuth, MI (US)

(73) Assignees: Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 227 days.

(21) Appl. No.: 17/745,213

(22) Filed: May 16, 2022

(65) Prior Publication Data

US 2022/0267498 A1 Aug. 25, 2022

Related U.S. Application Data

(62) Division of application No. 16/782,324, filed on Feb. 5, 2020.

(60) Provisional application No. 62/810,041, filed on Feb. 25, 2019.

(51) Int. Cl.
| | | |
|---|---|---|
| C08F 283/12 | (2006.01) | |
| C08F 2/18 | (2006.01) | |
| C08F 230/08 | (2006.01) | |
| C09D 183/12 | (2006.01) | |

(52) U.S. Cl.
CPC .............. *C08F 283/12* (2013.01); *C08F 2/18* (2013.01); *C08F 230/08* (2013.01); *C09D 183/12* (2013.01)

(58) Field of Classification Search
CPC ...... C08F 2/18; C08F 2/24; C08F 2/28; C08F 283/12
See application file for complete search history.

(56) References Cited

U.S. PATENT DOCUMENTS

| | | |
|---|---|---|
| 2,965,593 A | 12/1960 | Dietz |
| 4,859,740 A | 8/1989 | Damrath et al. |
| 5,385,975 A | 1/1995 | Nakamura et al. |
| 7,098,252 B2 | 8/2006 | Jiang et al. |
| 7,829,626 B2 | 11/2010 | Chiou et al. |
| 8,686,096 B2 | 4/2014 | Deetz et al. |
| 9,808,413 B2 | 11/2017 | Abe |
| 9,809,705 B2 | 11/2017 | Abe |
| 2016/0039963 A1* | 2/2016 | Fujikawa ............... C08L 27/04 525/63 |
| 2017/0247570 A1 | 8/2017 | Pirrung et al. |

FOREIGN PATENT DOCUMENTS

| | | |
|---|---|---|
| JP | 4337304 | 11/1992 |
| JP | 7286129 | 10/1995 |
| JP | 03580754 B2 | 10/2004 |
| JP | 03669898 B2 | 7/2005 |
| JP | 03770815 B2 | 4/2006 |
| JP | 03784292 B2 | 6/2006 |
| JP | 03821719 B2 | 9/2006 |
| JP | 03827617 B2 | 9/2006 |
| JP | 04489052 B2 | 6/2010 |
| JP | 04794313 B2 | 10/2011 |
| JP | 05231004 B2 | 7/2013 |

OTHER PUBLICATIONS

Kalihari, An automated high throughput tribometer for adhesion, wear, and friction measurements, Review of Scientific Instruments, 2013, 035104, vol. 84.

* cited by examiner

*Primary Examiner* — Margaret G Moore
(74) *Attorney, Agent, or Firm* — Reid S. Willis

(57) ABSTRACT

The present invention relates to a composition comprising an aqueous dispersion of polymeric composite microspheres comprising an aqueous dispersion of polymeric composite microspheres that comprise a polysiloxane and a polymer, as defined herein, and a suspension polymerization process for making the composition. The composition is useful for making defect free coatings with a relatively low coefficient of friction.

6 Claims, No Drawings

AQUEOUS DISPERSION OF POLYMERIC COMPOSITE MICROSPHERES

This application is a DIV of U.S. Ser. No. 16/782,324, now U.S. Pat. No. 11,370,867.

BACKGROUND OF THE INVENTION

The present invention relates to an aqueous dispersion of polymeric composite microspheres that comprise a polysiloxane and a polymer. The composite microspheres are useful for preparing formulations that form defective free coatings with a low coefficient of friction.

Low-gloss (matte, low-sheen) surfaces can be made applying to a substrate an aqueous dispersion containing organic or inorganic matting agents as well as binders. Organic non-film-forming matting agents in the range of 1-30 µm are preferred in part because they provide ease of application with desired surface roughness. Aqueous dispersions of silicone (polysiloxane) are commonly used in conjunction with matting agents to reduce the coefficient of friction of the final coating surface, thereby improving wear resistance. However, in general, these silicone dispersions are not compatible with aqueous coating compositions because they cause film defects. Silicone dispersions therefore need to be specially designed to be compatible, which is a time-consuming and costly solution.

U.S. Pat. Nos. 9,809,705 B2 and 9,808,413 B2 disclose modified unreactive (non-polymerizable) silicones fixed within polymer microspheres made by suspension polymerization in a batch process, at a solids content of about 25 weight percent.

Similarly, JP 04489052 B2, JP 04794313 B2, JP 03821719 B2, JP 03784292 B2, JP 03770815 B2, JP 03669898 B2, JP 03580754 B2, and JP 05231004 B2 disclose composite particles with designed shapes (convex, bowl, flat, curved, etc.) made by polymerizing ethylenically unsaturated monomers in the presence of non-polymerizable silicones in the same particle in a batch suspension polymerization process. However, to achieve high solids (>30%), the disclosed batch process either requires the use of inexpensive monomers with slow suspension polymerization reactivity (e.g., styrene or methyl methacrylate) or more reactive but expensive monomers (e.g., lauryl methacrylate or stearyl methacrylate).

It would be possible to reduce cycle times and increase solids content by increasing the concentration of the silicone additive, but this solution is impractical because of the high cost of silicones. Consequently, these aqueous dispersions of micron-sized silicone-composites are not used to coat substrates; instead, they find a niche in personal care and electronics applications where small amounts are used as part of the entire formulations.

Accordingly, it would be desirable in the field of organic matting agents to discover a way to prepare by suspension polymerization a low cost dispersion of organic microspheres that provides a coating with a low coefficient of friction and without defects.

SUMMARY OF THE INVENTION

The present invention addresses a need in the art by providing, in a first aspect, a process for preparing an aqueous dispersion of composite microspheres comprising the step of contacting, under polymerization conditions, an aqueous dispersion of first composite microspheres comprising a polysiloxane and structural units of a first monoethylenically unsaturated nonionic monomer with first stage monomers comprising, based on the weight of the first stage monomers, from a) 0.05 to 5 weight percent nonionic polyalkylene oxide or anionic polyalkylene oxide salt of a distyryl or tristyryl phenol; and b) from 85 to 99.95 weight percent of a second monoethylenically unsaturated nonionic monomer, to grow out the first composite microspheres to form an aqueous dispersion of second composite microspheres, wherein the first composite microspheres have an average particle size in the range of from 1 µm to 15 µm and the second composite microspheres have an average particle size in the range of from 1.1 µm and 25 µm; and wherein the nonionic polyalkylene oxide or anionic polyalkylene oxide salt of a distyryl or tristyryl phenol is represented by the compound of Formula I:

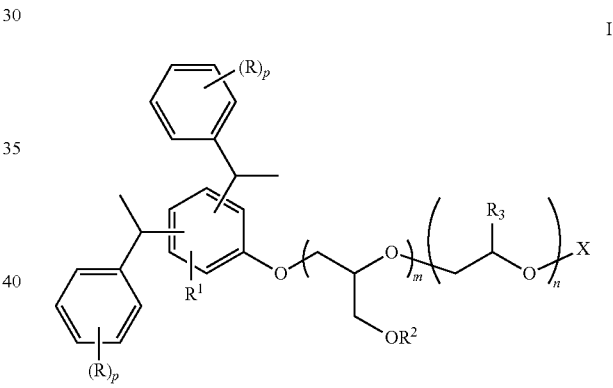

where each R is independently $C_1$-$C_4$-alkyl; $R^1$ is H, 1-phenethyl-$(R)_p$, $CH_2$—CR=$CH_2$, or CH=$CHCH_3$; each $R^2$ is independently H, allyl, methyl, acrylate, methacrylate, or —$CH_2CHR^3OX$; each $R^3$ is independently H, methyl, or ethyl; m is 0 to 5; n is 6 to 40; p is 0, 1 or 2; and O—X is hydroxyl, methoxyl, a sulfate or a phosphate.

In a second aspect, the present invention is a composition comprising an aqueous dispersion of polymeric composite microspheres comprising from 0.3 to 70 weight percent of a polysiloxane and from 30 to 99.7 weight percent of a polymer which is either a) functionalized with from 0.05 to 5 weight percent structural units of a nonionic polyalkylene oxide or anionic polyalkylene oxide salt of a distyryl or tristyryl phenol, based on the weight of the polymer or b) stabilized by 0.05 to 5 weight percent of the nonionic polyalkylene oxide or anionic polyalkylene oxide salt of a distyryl or tristyryl phenol, based on the weight of the polymer, wherein the nonionic polyalkylene oxide or anionic polyalkylene oxide salt of a distyryl or tristyryl phenol is represented by Formula I:

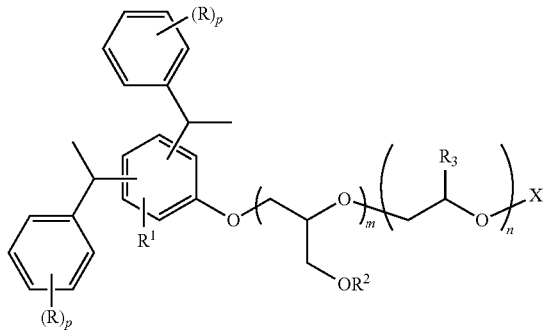

where each R is independently $C_1$-$C_4$-alkyl; $R^1$ is H, 1-phenethyl-$(R)_p$, $CH_2$—$CR$=$CH_2$, or $CH$=$CHCH_3$; each $R^2$ is independently H, allyl, methyl, acrylate, methacrylate, or —$CH_2CHR^3OX$; each $R^3$ is independently H, methyl, or ethyl; m is 0 to 5; n is 6 to 40; p is 0, 1 or 2; and O—X is hydroxyl, methoxyl, a sulfate or a phosphate; wherein the polymeric microspheres have a solids content in the range of from 10 to 60 weight percent, based on the weight of the microspheres and water; wherein the polymeric microspheres have an average particle size in the range of from 1 μm to 25 μm. The present invention addresses a need in the art by providing a composition that is useful for making defect free coatings with a low coefficient of friction.

DETAILED DESCRIPTION OF THE INVENTION

In a first aspect, the present invention is a process for preparing an aqueous dispersion of composite microspheres comprising the step of contacting, under polymerization conditions, an aqueous dispersion of first composite microspheres comprising a polysiloxane and structural units of a first monoethylenically unsaturated nonionic monomer with first stage monomers comprising, based on the weight of the first stage monomers, from a) 0.05 to 5 weight percent nonionic polyalkylene oxide or anionic polyalkylene oxide salt of a distyryl or tristyryl phenol; and b) from 85 to 99.95 weight percent of a second monoethylenically unsaturated nonionic monomer, to grow out the first composite microspheres to form an aqueous dispersion of second composite microspheres, wherein the first composite microspheres have an average particle size in the range of from 1 μm to 15 μm and the second composite microspheres have an average particle size in the range of from 1.1 μm and 25 μm;

and wherein the nonionic polyalkylene oxide or anionic polyalkylene oxide salt of a distyryl or tristyryl phenol is represented by the compound of Formula I:

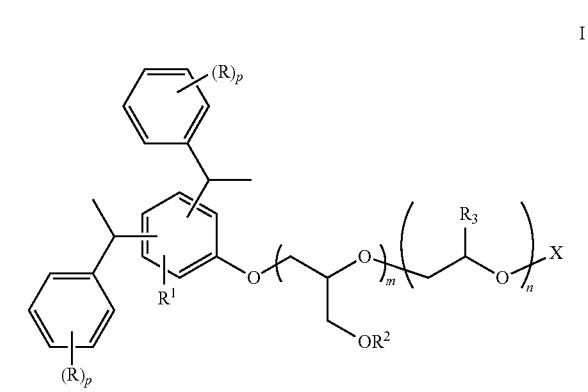

where each R is independently $C_1$-$C_4$-alkyl; $R^1$ is H, 1-phenethyl-$(R)_p$, $CH_2$—$CR$=$CH_2$, or $CH$=$CHCH_3$; each $R^2$ is independently H, allyl, methyl, acrylate, methacrylate, or —$CH_2CHR^3OX$; each $R^3$ is independently H, methyl, or ethyl; m is 0 to 5; n is 6 to 40; p is 0, 1 or 2; and O—X is hydroxyl, methoxyl, a sulfate or a phosphate.

A more preferred polyethylene oxide salt of tristyryl phenol is represented by the compound of Formula II:

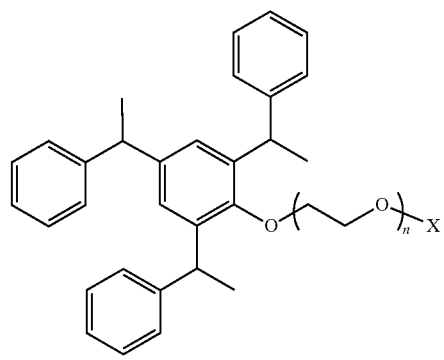

where X is —$SO_3H$, —$SO_3Y$, —$H_2PO_3$, —$HPO_3Y$, or —$PO_3Y_2$, where Y is $Li^+$, $Na^+$, $K^+$, or $NH_4^+$. An example of a commercially available compound of Formula II is Solvay Soprophor 4D/384 ammonium salt of polyarylphenyl ether sulphate.

Another preferred ethylene oxide salt of distyryl phenol or tristyryl phenol, where m is non-zero, is represented by the compound of Formula III.

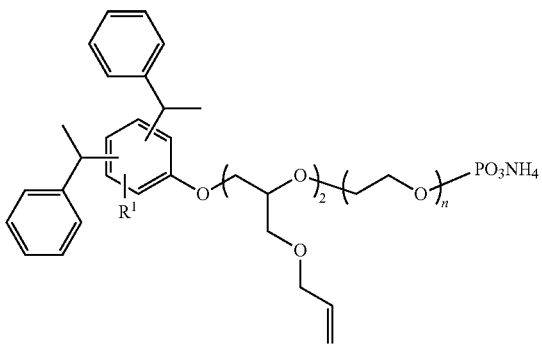

where n is preferably 12 to 18. A commercial example of the compound of Formula III is E-Sperse RS-1684 reactive surfactant.

Another example of a polyethylene oxide salt of a distyryl phenol is represented by the compound of Formula IV:

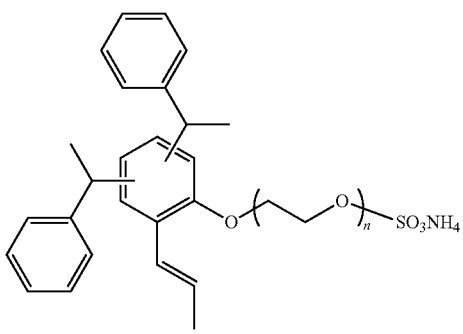

A commercial example of the compound of Formula IV is Hitenol AR-1025 reactive surfactant.

A subclass of compounds of structure I (m=0) can be prepared by reacting distyryl or tristyryl phenol with an alkylene oxide (ethylene oxide, 1,2-propylene oxide, or 1,2-butylene oxide) in the presence of a base such as an alkali metal or alkaline earth metal hydroxide, carbonate, or bicarbonate, or an alkali metal hydride; this intermediate can then be neutralized to the corresponding glycol, methoxylated with a methyl halide, sulfonated with sulfonyl chloride, or phosphorylated with polyphosphoric acid. A compound of Formula III can be prepared in the same manner except that the distyryl or tristyryl phenol is first reacted with an epihalohydrin such as epichlorohydrin in the presence of a base to form the corresponding monoglycidyl ether of the distyryl or tristyryl phenol prior to reaction with the alkylene oxide.

As used herein, the term "structural unit" of the named monomer, refers to the remnant of the monomer after polymerization. For example, a structural unit of methyl methacrylate is illustrated by the following structure:

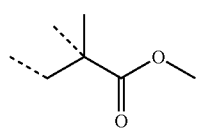

wherein the dotted lines represent the points of attachment of the structural unit to the microsphere.

As used herein "composite microspheres" refer to micron-size polymer particles in which polysiloxane and the polymer comprising structural units of the ethylenically unsaturated nonionic monomer are physically incorporated into the same particle.

The polysiloxane is linear, branched, or crosslinked or combinations thereof, and comprises repeat units of Si—O—Si groups and Si-alkyl groups; the polysiloxane optionally comprises, for example, Si—O-alkyl, Si-aryl, Si—OH, Si—H, and/or Si—O-trialkylsilyl groups. Preferably, the polysiloxane is a linear polymer represented by Formula V:

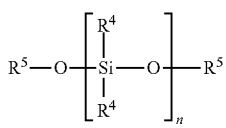

wherein each $R^4$ is independently $C_1$-$C_{30}$-alkyl, O—$C_1$-$C_6$-alkyl, or H, with the proviso that at least one $R^4$ is $C_1$-$C_{30}$-alkyl; each $R^5$ is independently $C_1$-$C_{30}$-alkyl, H, or $Si(R^6)_3$; wherein each $R^6$ is independently $C_1$-$C_6$-alkyl; and n is from 4, more preferably from 10, to 10,000, more preferably to 5000. Preferably, each $R^4$ is independently $C_1$-$C_6$-alkyl, more preferably ethyl or methyl, most preferably methyl; preferably, each $R^5$ is H; and preferably each $R^6$ is methyl.

The polysiloxane is preferably unreactive under free-radical polymerization conditions; accordingly, the composite is preferably a physical blend of the polysiloxane and the polymer in the same particle. Composite microsphere average particles size refer to average particle size as measured by Optical Microscopy as described hereinbelow.

The polymer portion of the first composite microspheres preferably comprise from 85 to 99.9 weight percent structural units of a monoethylenically unsaturated nonionic monomer, examples of which include acrylates such as ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate. Although it is possible for the polymer portion of the first composite microspheres to include structural units of carboxylic acid monomers such as methacrylic acid or acrylic acid, it is preferred that the polymer portion comprises less than 5, more preferably less than 3, and most preferably less than 1 weight percent structural units of a carboxylic acid monomer, based on the weight of the polymer portion of the first composite microspheres. The polymer portion of the first composite microspheres more preferably comprise structural units of acrylates or methacrylates or combinations of acrylates and methacrylates.

The polymer portion of the first composite microspheres preferably further comprises structural units of a multiethylenically unsaturated nonionic monomer, preferably at a concentration in the range of from 0.1, more preferably from 1, and most preferably from 2 weight percent, to 15, more preferably to 10, and most preferably to 8 weight percent, based the weight of the polymer portion of the first composite microspheres. Examples of suitable multiethylenically unsaturated nonionic monomers include allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate.

Preferably, the particle size of the first composite microspheres is in the range of from 1.5 µm, more preferably from 3.0 µm, preferably to 15 µm.

The first composite microspheres are advantageously prepared from an aqueous dispersion of the polysiloxane as a seed. The polysiloxane seed has an average diameter by Optical Microscopy in the range of from 0.5 µm, more preferably from 1.0 µm, and most preferably from 2.0 µm, to 15 µm, preferably to 10 µm, more preferably to 8.0 µm, and most preferably to 5.0 µm. An aqueous dispersion of polysiloxane seed is advantageously prepared by high-shear mixing in the presence of an aqueous solution of an emulsifying surfactant, preferably an anionic surfactant such as a phosphate, or an alkyl benzene sulfonate or sulfate preferably in the range of from 0.1 to 5, more preferably to 1 weight percent, based on the weight of the polysiloxane.

An aqueous dispersion of the polysiloxane seed and a hydrophobic initiator are advantageously contacted under polymerization conditions with a first monoethylenically unsaturated monomer; alternatively, monomer can be swollen into the polysiloxane seed, followed by addition of the hydrophobic initiator. The hydrophobic initiator is preferably added in the form of an aqueous dispersion.

As used herein, a hydrophobic initiator refers to an initiator having a water solubility in the range of from 5 ppm, preferably from 10 ppm, to 10,000, preferably to 1000, and more preferably to 100 ppm. Examples of suitable hydrophobic initiators include such as t-amyl peroxy-2-ethylhexanoate (water solubility=17.6 mg/L at 20° C.) or t-butyl peroxy-2-ethylhexanoate (water solubility=46 mg/L at 20° C.). Examples of suitable monoethylenically unsaturated nonionic monomers include acrylates such as methyl acrylate, ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate.

The first composite microspheres can also be prepared from an aqueous dispersion of a solution of the polysiloxane and the ethylenically unsaturated nonionic monomers. An aqueous dispersion of the solution is advantageously formed by high-shear mixing in the presence of a surfactant of the type and in the amounts used to prepare the polysiloxane seed dispersion. The aqueous dispersion of the hydrophobic initiator is then contacted with the aqueous dispersion of the solution of the polysiloxane and the ethylenically unsaturated nonionic monomers. The hydrophobic initiator may be dissolved in the dissolution step; in this instance, the choice of hydrophobic initiator is broadened because an initiator with a water-solubility of <5 ppm would be effective if the initiator is dissolved along with the polysiloxane and the ethylenically unsaturated nonionic monomers. Examples of such initiators of very low water solubility include dilauroyl peroxide, 1,1,3,3-tetramethylbutyl peroxy-2-ethylhexanoate and 2,5-dimethyl-2,5-di(2-ethylhexanoylperoxy)hexane.

In a preferred process of the present invention, the aqueous dispersion of first composite microspheres is contacted under polymerization conditions and in the presence of an emulsifying surfactant, such as a phosphate or an alkyl benzene sulfonate or sulfate, with first stage monomers comprising, based on the weight of the first stage monomers, from 0.05, preferably from 0.1, and more preferably from 0.2 weight percent, to 5, preferably to 3, more preferably to 2, and most preferably to 1 weight percent of the nonionic polyalkylene oxide or anionic polyalkylene oxide salt of a distyryl or tristyryl phenol; and from 85, preferably from 90 weight percent, to 99.95, preferably to 99.8 weight percent of a second monoethylenically unsaturated nonionic monomer. The first composite microspheres increase in volume (grow out) to form an aqueous dispersion of second composite microspheres having a particle size in the range of from 1.1 µm, and preferably from 1.5 µm, preferably from 3.5 µm, to 25 µm, more preferably to 20 µm, and most preferably to 15 µm.

The first stage monomers preferably further comprises a multiethylenically unsaturated nonionic monomer, preferably at a concentration in the range of from 0.1, more preferably from 1, and most preferably from 2 weight percent, to 15, more preferably to 10, and most preferably to 8 weight percent, based the weight of first stage monomers. Examples of suitable multiethylenically unsaturated nonionic monomers include allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate.

The first stage monomer as well as the second composite microspheres preferably comprise a substantial absence of structural units of a carboxylic acid monomer. As used herein, a substantial absence of structural units of a carboxylic acid monomer means less than 5, preferably less than 3, more preferably less than 1, and most preferably less than 0.2 weight percent structural units of a carboxylic acid monomer such as methacrylic acid or acrylic acid, based on the weight of the microspheres.

The polymer portion of the second composite microspheres preferably comprise from 90 to 98 weight percent structural units of a second monoethylenically unsaturated nonionic monomer, which may be the same as or different from the first monoethylenically unsaturated nonionic monomer. It is understood that "monomer" refers to one or more monomers.

The second composite microspheres can be contacted under polymerization conditions with monoethylenically unsaturated nonionic monomer (second stage ethylenically unsaturated nonionic monomer), which may be the same as of different from the first stage monoethylenically unsaturated nonionic monomer, to yield a dispersion of third composite microspheres. A water-soluble initiator/redox couple such as t-butyl hydroperoxide and isoascorbic acid (t-BHP/IAA) is advantageously used to control morphology of the third composite microspheres.

In a second aspect, the present invention is a composition comprising an aqueous dispersion of polymeric composite microspheres comprising a) from 0.3, preferably from 1 weight percent, to 70, preferably to 40 weight percent, based on the weight of the composite, of a polysiloxane; and b) from 30, preferably from 60 weight percent to 99.7, preferably to 99 weight percent of a polymer comprising from 0.05, preferably from 0.1, and more preferably from 0.2 weight percent, to 5, preferably to 3, more preferably to 2, and most preferably to 1 weight percent, based on the weight of the microspheres, of a nonionic polyalkylene oxide of a distyryl or tristyryl phenol or an anionic polyalkylene oxide salt of a distyryl or tristyryl phenol, preferably the compound of Formula I or a salt thereof; wherein the polymeric composite microspheres have a solids content in the range of from 10 to 60 weight percent, based on the weight of the microspheres and water, an average particle size as measured by optical microscopy in the range of from 1 μm to 25 μm.

Preferably, the solids content is in the range of from 20, more preferably from 25, and most preferably from 30 weight percent, to 50, more preferably to 47 weight percent, based on the weight of the microspheres and water.

Preferably, the aqueous dispersion of polymeric composite microspheres comprises less than 1, more preferably less than 0.5, more preferably less than 0.2, and most preferably less than 0.1 weight percent gel, based on the weight of the composition, calculated as described in the Examples section. In another aspect, the polymeric microspheres are either stabilized or functionalized with anionic polyalkylene oxide salt of a distyryl or tristyryl phenol, preferably at a concentration in the range from 0.2 to 2 weight percent, based on the weight of the microspheres.

The aqueous dispersion of composite microspheres is useful in coatings applications, especially where a matte finish is desired. Examples of such applications include leather, plastic packaging, wood, architectural coatings, metal, and glass coatings. The aqueous dispersion of composite microspheres may optionally include one or more additional components such as binders, thickeners, pigments, biocides, solvents, dispersants, coalescents, opaque polymers, and extenders. Examples of binders include polyacrylics, polystyrene-acrylics, polyurethanes, polyolefins, alkyds, and polyvinyl esters.

It has been discovered that the aqueous dispersion of composite microspheres achieve superior results over a non-composite aqueous blend of the polysiloxane and microspheres. The aqueous dispersion of the composite gives coatings with reduced coefficient of friction and without defects.

Method for Measuring Less than 5% Gel Formation

Pre-weighted sample (100 to 4,000 g) were poured through 150-μm screen then the screen was washed with copious amounts of water and gel was collected separately and dried at 150° C. for 30 min. The gel data is calculated as the weight ratio of the collected total dry gel in each screen over the total sample size:

gel %=dry gel/total sample×100; gel ppm=dry gel/total sample×10$^6$

Method for Measuring More than 5% Gel Formation

Pre-weighted sample (100 g) were poured through a 150-μm screen and the filtrate was collected separately, whereupon solids of the filtrate was measured. The gel data is calculated as difference between theoretical solid and filtrate solids where theoretical solids are calculated as follows:

Theoretical solids %=active ingredients/total amounts added to the batch×100 gel %=theoretical solids %−filtrate solids %

Optical Microscopy Particle Sizing Method

For particles having diameters in the range of from 1.0 μm to 25 μm, a diluted aqueous solution of composite microspheres was deposited on a standard glass microscope slide and a cover glass slip was placed on the wet sample, which were imaged with a Leitz Orthoplan Trinocular Microscope equipped with an Evolution VF Monochrome camera. Images were collected using a Zeiss 25× lens using Q-Capture software (version 2.9.13). Images were then processed using ImageJ software (version 1.50i, NIH, USA). The image scale in ImageJ was set as 5.45 pixel/μm (as determined previously from the image of a stage micrometer of known dimensions under the same imaging conditions). The diameters of a minimum of ten representative particles were measured manually using ImageJ's measure function. An average of the measurements was recorded to determine the average particle size.

Preparation of Silicone Dispersion 1

In a 2-L stainless steel beaker, Polystep A-16-22 sodium salt of a branched alkylbenzene sulfonic acid (A-16-22, 28.0 g, 22.0% aq.) was mixed with deionized water (176.5 g) using a Lightnin mixer until the surfactant was homogenously dispersed. DOWSIL™ Q1-3563 Polydimethyl Siloxane (PDMS, 1544.0 g, kinematic viscosity=80 centistokes (cSt), measured at 25° C., A Trademark The Dow Chemical Company or Its Affiliates) was fed over 15 min to the beaker while increasing the mixer speed for adequate mixing. At the end of the feed, more A-16-22 (28.0 g, 22.0% aq.) was added to the beaker, and the dispersion was mixed for 15 min at 1500 rpm. Additional deionized water (223.6 g) was added to the beaker with mixing. The silicone dispersion 1 was analyzed for percent solids (77.1%), and particle size (4.7 μm, as measured by Optical Microscopy).

Example 1—Preparation of Silicone-Acrylic Composite Microspheres Using Silicone Dispersion 1 and Reactive Ethylene Oxide Salt of Distyryl Phenol Initiator emulsion was prepared by combining in a vial deionized water (01.0 g), A-16-22 (1.0 g, 22.0% aq.), 4-hydroxy 2,2,6,6-tetramethylpiperidine (4-hydroxy TEMPO, 0.5 g, 5.0% aq.), t-amyl peroxy-2-ethylhexanoate (TAPEH, 7.0 g, 98% active), then agitating the mixture with a stir bar for 10 min. A shot monomer emulsion (shot ME) was prepared in a separate flask by combining deionized water (139.7 g), E-Sperse RS-1684 Reactive Surfactant (RS-1684, 5.9 g, 30% aq.), A-16-22 (5.4 g, 22.0% solution), 4-hydroxy TEMPO (0.4 g, 5.0% aq.), n-butyl acrylate (BA, 331.4 g), and allyl methacrylate (ALMA, 13.8 g). Deionized water (1485 g) was added to a 5-L round bottom flask (reactor) fitted with a stirrer, condenser, and a temperature probe. The reactor was heated to 78° C.; in the meantime the silicone dispersion 1 (70.0 g, 77.1% active) was diluted with deionized water (100 g) and mixed. When the reactor temperature reached 78° C., the heater was turned off; a cup containing diluted silicone dispersion 1 was then added to the reactor; the cup was rinsed with deionized water (100 g), after which time shot ME was fed into the reactor over 17 min. After 45 min, the reactor cooled down to temperature at 62° C., whereupon the initiator emulsion was added to the reactor. After an induction period of 70 min, the resultant exotherm caused the reactor temperature to rise to 83° C. The particle size of the microspheres formed in this step was measured to be 10.6 µm by Optical Microscopy.

A first monomer emulsion (ME1), prepared by combining deionized water (366.3 g), RS-1684 (15.3 g, 30% aq.), A-16-22 (14.3 g, 22.0% aq.), 4-hydroxy TEMPO (1.2 g, 5.0% aq.), BA (869.5 g), and ALMA (36.3 g) was then fed into the reactor over 30 min while maintaining the reactor temperature at 81° C. Remaining residual monomers were chased by raising the reactor temperature to 95° C. and maintaining reactor temperature for 60 min. Reactor was then cooled to ambient temperature and the consequent dispersion was filtered through a 150-µm screen; gel that remained on the screen was collected and dried (10 ppm). The filtrate was analyzed for percent solids (35.5%), and particle size (14.0 µm, as measured by Optical Microscopy), and the final silicone level was 4.1 weight percent based on total solids.

Example 2—Preparation of Silicone-Acrylic Composite Microspheres Using Silicone Dispersion 1 and Non-Reactive Ethylene Oxide Salt of Tristyryl Phenol The process of was carried out essentially as described for Example 1 except that Solvay Soprophor 4D/384 ammonium salt of polyarylphenyl ether sulphate (4D/384) was used in place of RS-1684 in shot ME (4D/384, 6.9 g, 25.4% active), ME1 (4D/384, 18.1 g, 25.4% active). The particle size of the micro spheres was 10.1 µm following the shot ME polymerization step and 13.8 µm following the ME1 polymerization step as measured by Optical Microscopy. After the ME1 polymerization step and 150-µm filtration, the percent solids of the filtrate was 35.5% and gel formation was 73 ppm. The final silicone level was 4.1 weight percent based on total solids.

Comparative Example 1—Preparation of an Aqueous Dispersion of Silicone-Acrylic Composite Microspheres Using Silicone Dispersion 1 without Ethylene Oxide Salt of Distyryl Phenol or Tristyryl Phenol Surfactants in Any Stages The process of was carried out essentially as described for Example 1 except that there was no RS-1684 in any stages. The particle size of the microspheres was 8.9 µm following the shot ME polymerization step as measured by Optical Microscopy. After the ME1 polymerization step and 150-µm filtration, the percent solids was 4.0% and gel formation was 31.6% (theoretical solids are 35.6%). Particle size could not be measured because most of the material formed gel. The final silicone level was 4.1 weight percent based on total solids.

Comparative Intermediate Example 1—Preparation of an Aqueous Dispersion of Non-Composite Acrylic Microspheres Initiator emulsion was prepared by combining in a separate vial deionized water (0.6 g), A-16-22 (1.0 g, 22.0% aq.), 4-hydroxy TEMPO (0.4 g, 5.0% aq.), TAPEH (7.0 g, 98% active), then agitating the mixture with a stir bar for 10 min. The initiator emulsion was then added to the dispersion of the acrylic oligomer seed (1.2 g, 32.2% solids), which was prepared substantially as described in U.S. Pat. No. 8,686,096, Examples 1 and 5 (col. 19 and 20), in a separate vial and mixed for 30 min. A shot ME was prepared in a separate flask by combining deionized water (135.0 g), A-16-22 (4.9 g, 22.0% solution), 4-hydroxy TEMPO (0.4 g, 5.0% aq.), RS-1684 (5.3 g, 30% aq.), BA (300.2 g), and ALMA (12.3 g). Deionized water (2000 g) was added to a 5-L round bottom flask (reactor) fitted with a stirrer, condenser, and a temperature probe. The reactor was heated to 66° C., after which time the initiator and oligomer seed mixture was added to the reactor, and shot ME was fed into the reactor over 18 min. After an induction period of 30 min, the resultant exotherm caused the reactor temperature to rise to 80° C.

ME1, which was prepared by combining deionized water (405.0 g), A-16-22 (14.8 g, 22.0% solution), 4-hydroxy TEMPO (1.2 g, 5.0% aq.), RS-1684 (15.9 g, 30% aq.), BA (900.7 g), and ALMA (37.6 g), was then fed into the reactor over 55 min while maintaining reactor temperature at 80° C. Following the 20 min hold after end of the ME1 feed, residual monomers were polymerized by raising the reactor temperature to 92° C. and holding for 60 min. The reactor was then cooled to ambient temperature and the consequent dispersion was filtered through a 150-µm screen. The filtrate was analyzed for percent solids (31.1%), and particle size (11.5 µm, as measured by Optical Microscopy).

Coating Preparation Method

Drawdowns were made with an adjustable gap blade set to 7-mil thickness. The substrate was glass for coefficient of friction measurements, and black Leneta charts for gloss measurements.

Gloss Measurement Method

Gloss was measured using a BYK micro-TRI-gloss meter to measure 60° and 85° gloss. The measurements are taken at 5 different spots along the drawdown, and averaged to obtain the final reading.

Kinetic Coefficient of Friction (COF) Measurement Method

The measured force was obtained from a tribometer system that applies 50, 125, and 250 g of force using ⅜" diameter nylon balls. The balls were pulled along the coated glass substrate for 1 cm 10 times, in three different spots for each applied normal force. The measured force was then averaged from these three spots. Kinetic COF was calculated as the slope of the normal force (x-axis) versus measured force (y-axis) as described by Kalihari et al. in Rev. Sci. Instrum. 84, 035104 (2013).

Coating Quality Evaluation Method

Drawdowns on a black and white Leneta chart were prepared by hand using 3-mL thickness steel drawdown bar.

The coating was dried at 150° C. for 2 min. Samples were examined visually both in their wet and dry state for large visible craters in the film.

Coating Example 1—Preparation of a Coating Formulation and Application

The dispersion of composite microspheres from example 1 (66.3 g, 35.5% solids) was placed in a 200-mL size plastic container, which was then secured and placed under overheard stirrer. While mixing, a 2-stage acrylic binder—80 (96.5 ethyl acrylate/3.5 acrylic acid)/20 (methyl methacrylate, as disclosed in U.S. Pat. No. 7,829,626 (83.3 g, 34.5% solids), dilution water (16.4 g) and NH$_4$OH (1.6 g, 10% aq.) were added the container. As a last step, 3-times diluted ACRYSOL™ ASE-60 Thickener (ASE-60, A Trademark of The Dow Chemical Company or its Affiliates, 12.4 g, 9.3% active) was slowly added to the container as the viscosity of the mixture is increased while agitation is adjusted accordingly for adequate mixing. The sample was coated on a glass substrate and dried; kinetic COF was measured to be 0.08, with coefficient of determination ($R^2$)=0.99 for the fitting. The sample was also coated on black Leneta paper and dried; gloss at 60° and 85° were measured to be 2.4 and 2.6 respectively. A hand drawdown sample had no craters in both the wet and dry states of the film.

Comparative Coating Example 1—Preparation of Coating Formulation and Application Using Non-Composite Microspheres The formulation was prepared as described in Coating Example 1 except that instead of using the composite of Example 1, the non-composite dispersion of Intermediate Comparative Example 1 (75.5 g, 31.1% solids) was used, and the amount of dilution water was 7.2 g. The kinetic COF was measured to be 0.13 with $R^2$=0.99 for the fitting. The sample was also coated on a black Leneta paper substrate and gloss at 60° and 85° were measured to be 3.0 and 3.4 respectively. A hand drawdown sample had no craters in both wet and dry state of the film.

Comparative Coating Example 2—Preparation of Coating Formulation and Application Using Silicone Dispersion and Non-Composite Microspheres The formulation was prepared as described in Comparative Example 1 except that the amount of Intermediate Comparative Example 1 was 72.4 g; and silicone dispersion 1 (1.3 g, 77.1% active) was added to the plastic container after addition of the dispersion of Comparative Intermediate Example 1. The amount of dilution water was 9.0 g. The kinetic COF was measured to be 0.10, with $R^2$=0.95 for the fitting. The sample was also coated on a black Leneta paper substrate and gloss at 60° and 85° were measured to be 2.9 and 3.5 respectively. A hand drawdown sample showed many large visible craters in both the wet and dry state of the film.

Table 1 illustrates the coefficients of friction, cratering, and gloss at 85° and 60° for Coating Example 1 (Coat Ex 1) and Comparative Coating Examples 1 and 2 (Comp. Coat Ex 1 and Comp. Coat Ex. 2).

TABLE 1

Comparison of Coatings with and without Polymeric Composite Microspheres

| Coating Component (% active) | Coat Ex 1 | Comp. Coat Ex 1 | Comp. Coat Ex 2 |
|---|---|---|---|
| Ex. 1 (35.5%) | 66.3 g | | |
| Comp. Int Ex. 1 (31.1%) | | 75.5 g | 72.4 g |
| Silicone dispersion 1 (77.1%) | | | 1.3 g |
| Dilution Water | 16.4 g | 7.2 g | 9.0 g |
| Properties | | | |
| Coefficient of Friction Kinetic | 0.08 | 0.13 | 0.10 |
| $R^2$ for Coefficient of Friction | 0.99 | 0.99 | 0.95 |
| Gloss at 85° | 2.6 | 3.4 | 3.5 |
| Gloss at 60° | 2.4 | 3.0 | 2.9 |
| Craters in the film? | N | N | Y |

The data show that the dispersion of the composite microspheres (Coating Example 1) exhibit defect free coatings (no craters) as compared with compositions that contain dispersions of organic microspheres and polysiloxanes not in composite form (Comparative Coating Example 2). Moreover, the coefficient of friction for Coating Example 1 is superior to the composition that just contains the dispersion of non-composite acrylic microspheres (Comparative Coating Ex 1). Thus, whereas the presence of composite microspheres comprising both the acrylic polymer and the polysiloxane provides defect free coatings, free polysiloxanes without the protection of the microsphere exacerbates the formation of defects in the coating. Compositions that contain microspheres but no polysiloxane, either free or as part of a composite, form coatings that are defect free but exhibit a high coefficient of friction. Finally, the presence of polysiloxane in the composite does not adversely impact gloss at 60° and 85°.

The invention claimed is:

1. A process for preparing an aqueous dispersion of composite microspheres comprising the step of contacting, under polymerization conditions, an aqueous dispersion of first composite microspheres comprising a polysiloxane and structural units of a first monoethylenically unsaturated nonionic monomer with first stage monomers comprising, based on the weight of the first stage monomers, from a) 0.05 to 5 weight percent of a nonionic polyalkylene oxide or anionic polyalkylene oxide salt of a distyryl or tristyryl phenol; and b) from 85 to 99.95 weight percent of a second monoethylenically unsaturated nonionic monomer, to grow out the first composite microspheres to form an aqueous dispersion of second composite microspheres, wherein the first composite microspheres have an average particle size in the range of from 1 μm to 15 μm; and the second composite microspheres have a particle size in the range of from 1.5 μm to 20 μm; wherein the polysiloxane is represented by Formula V:

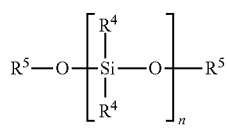

V wherein each $R^4$ is independently $C_1$-$C_{30}$-alkyl, O—$C_1$-$C_6$-alkyl, or H, with the proviso that at least one $R^4$ is $C_1$-$C_{30}$-alkyl; each $R^5$ is independently $C_1$-$C_{30}$-alkyl, H, or $Si(R^6)_3$; wherein each $R^6$ is independently $C_1$-$C_6$-alkyl; and n is from 4 to 10,000;

wherein the nonionic polyalkylene oxide or anionic polyalkylene oxide salt of the distyryl or tristyryl phenol is represented by:

a) the compound of formula II:

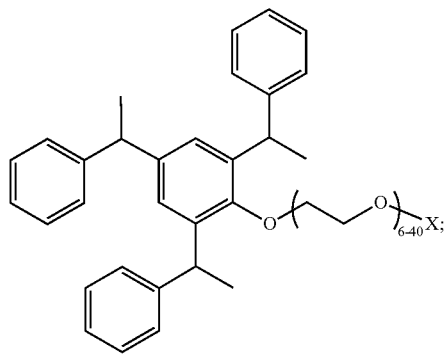

II where X is H, methyl, —$SO_3H$, —$SO_3Y$, —$H_2PO_3$, —$HPO_3Y$, or —$PO_3Y_2$, where Y is $Li^+$, $Na^+$, $K^+$, or $NH_4^+$; and n is 6 to 40; or b) the compound of formula III:

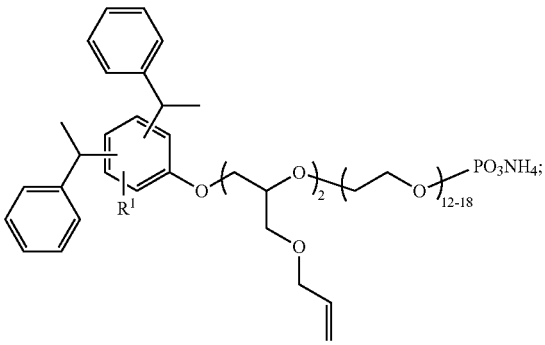

III or c) the compound of formula IV:

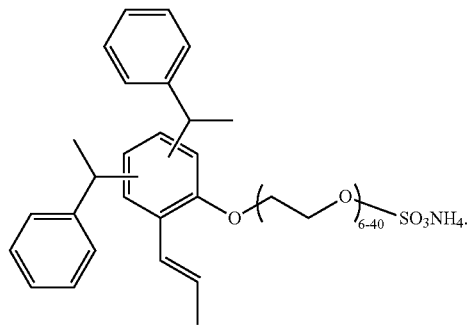

IV

2. The process of claim 1, wherein each $R^4$ is methyl.

3. The process of claim 1 wherein the first stage monomers further comprise from 0.1 to 15 weight percent, based on the weight of first stage monomers, of a multiethylenically unsaturated nonionic monomer.

4. The process of claim 1 wherein the first composite microspheres are prepared by contacting under polymerization conditions an aqueous dispersion of a polysiloxane and a first monoethylenically unsaturated monomer.

5. The process of claim 3 wherein the dispersion of second composite microspheres is further reacted with a second stage monoethylenically unsaturated nonionic monomer, in the presence of t-butyl hydroperoxide and isoascorbic acid.

6. The process of claim 1 which further comprises the step of contacting the aqueous dispersion of composite microspheres with one or more components selected from the group consisting of binders, thickeners, pigments, biocides, solvents, dispersants, coalescents, opaque polymers, and extenders.

* * * * *